N° 2,951,097

HALOCARBON HAVING THE EMPIRICAL FORMULA $C_{10}Cl_4F_8$

Samuel Gelfand, Niagara Falls, N.Y., assignor to Hooker Chemical Corporation, Niagara Falls, N.Y., a corporation of New York No Drawing. Filed Nov. 29, 1957, Ser. No. 699,438

2 Claims. (Cl. 260—648)

This invention relates to a new and useful chemical compound composed of carbon, chlorine and fluorine, i.e., a halocarbon having an empirical formula $C_{10}Cl_4F_8$ and a melting point of about 74 to 75 degrees centigrade.

The compound of this invention may be prepared by coupling 1,2,3,3-tetrachlorotetrafluorocyclopentene with itself, in the presence of copper, while heating to the reflux temperature of the reaction mixture and recovering the $C_{10}Cl_4F_8$ so produced.

In preparing the compound of this invention, presumably in accordance with the following equation:

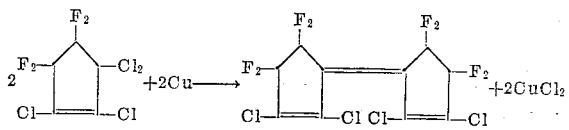

the starting material, 1,2,3,3-tetrachlorotetrafluorocyclopentene, is heated in the presence of metallic copper, either alone or in the presence of a solvent to the reflux temperature where reaction occurs. The solvent must be inert with respect to the reactants and the reaction products; also, its boiling point should be sufficiently different from that of the product to permit easy isolation of the product by distillation of either the product or the solvent. Among the solvents which may be employed are toluene, monochlorobenzene, hexachlorobutadiene and other materials inert under optimum reaction temperature of about 100 to 250 degrees centigrade.

In a preferred embodiment of this invention an excess of tetrachlorotetrafluorocyclopentene is used as the reaction medium and is heated to the initial reflux temperature of about 150 degrees centigrade.

From the foregoing equation it can be seen that the proportion of copper required is one mole for each mole of the tetrachlorotetrafluorocyclopentene. However, this may be varied to a range of about two moles of copper to one mole of starting material. Also, it should be noted that chlorine is eliminated as copper chloride. The product may be isolated by filtration of the mixture to remove copper chloride, and distilled to remove diluent and unreacted starting materials. The reaction is performed at substantially atmospheric pressure, although super-atmospheric pressure does not adversely affect the yield.

The compound of this invention is useful as a chemical intermediate, as is more fully illustrated in an example given hereinafter, which shows its use as a reactant to produce $C_{10}Cl_4F_{14}$ having a distillation range of 220 to 235 degrees centigrade, which compound is disclosed and claimed in my copending application S.N. 699,519, filed of even date herewith, in the name of Charles F. Baranauckas and Samuel Gelfand.

The following examples illustrate methods for the preparation and utility of the compound of this invention; however, they are not to be construed as limiting except as defined in the appended claims.

EXAMPLE I

*Preparation*

Ten moles (2,780 grams) of 1,2,3,3-tetrachlorotetrafluorocyclopentene and 370 grams of copper powder were charged into a five liter, three-necked round bottom flask equipped with a sealed stirrer, a thermometer, a reflux condenser and heating and/or cooling means. The reactants were heated to a reflux temperature of about 154 degrees centigrade while maintaining efficient agitation. While the reaction mixture was maintained at reflux by heating, the reaction was continued, with periodic addition of copper powder until a total of 1,370 grams had been added. As the reaction proceeded the temperature of the reaction mixture in the liquid phase rose from about 150 degrees centigrade until a final temperature of about 185 degrees centigrade was reached. Thereafter, the reaction mixture was filtered with the major portion of the product being in the filtrate. The residual cake of copper and copper chlorides was extracted twice with hot carbon tetrachloride to recover absorbed starting material and product and the extract was distilled to remove the carbon tetrachloride. The residue from the distillation of the carbon tetrachloride extraction mixture was combined with the filtrate from the reaction mixture and was distilled, to recover unreacted starting material and to isolate the product. An 80 percent yield of a colorless to pale yellow liquid (1,218 grams, 3.0 moles) having a boiling point of about 90 degrees centigrade at 1 mm., was obtained. The product solidified on standing. After two recrystallizations from ethanol, colorless needles were obtained, analyzed, and found to possess a melting point range of 74 to 75 degrees centigrade, a chlorine content of 34.5 percent by weight, which corresponds to $C_{10}Cl_4F_8$ having a theoretical chlorine content of 34.3 percent by weight. The infrared spectrum showed absorption characteristic of C=C double bonds at $6.45\mu$. The ultraviolet spectrum showed peaks at 285, 296 and 309 m$\mu$, $\epsilon_{296}=41,300$.

EXAMPLE II

One mole (279 grams) of 1,2,3,3-tetrachlorotetrafluorocyclopentene, 100 grams of absolute ethanol and 2 grams of 5 percent by weight of palladium-on-carbon powder were charged into a one liter, three-necked round bottom flask equipped with a sealed stirrer, a thermometer, a gas inlet tube, a reflux condenser and heating and/or cooling means. Hydrogen was introduced into the flask through the gas inlet tube under the surface of the liquid reaction mixture. The gas inlet tube was equipped with means for dispersing the hydrogen gas into small bubbles to facilitate its solution into the reaction mixture and its subsequent absorption by the catalyst. The temperature of the reaction mixture rose to 55 degrees centigrade as a result of the heat of reaction. Once the heat of reaction had moderated to such an extent that the temperature of the liquid reaction mixture began to decrease, a temperature of about 50 to about 60 degrees centigrade was maintained by external heating. A total reaction time of fourteen hours elapsed before the reaction mixture was filtered and washed with water to remove ethanol, then dried and distilled to give an 83 percent yield (125 grams, 0.6 mole) of $C_{10}Cl_4F_8$. The product obtained from this experiment was analyzed by means of infrared spectra and its spectra was found to be identical to that of the product obtained in Example I.

EXAMPLE III

*Use as chemical intermediate*

$C_{10}Cl_4F_8$ (1,200 grams) prepared as in Example I was charged into a two liter, three-necked round bottom flask equipped with a sealed stirrer, a thermometer, a reflux condenser and heating and/or cooling means. Fifty grams of cobalt trifluoride was added to the reactor and the reaction mixture was heated to 170 to 180 degrees centigrade at which point the cobalt salts changed in color from brown to pink. The mixture was cooled to 120 degrees centigrade, an additional 50 grams of cobalt trifluoride was added, and the resultant mixture was heated to 170 to 180 degrees centigrade. This procedure was repeated until a total of 1600 grams of cobalt trifluoride had been added. At this stage the reaction was not complete, but the reaction mixture contained such a high percent of solids that agitation became inefficient. As a result the reaction mixture after cooling was filtered and the filter cake was extracted twice with hot carbon tetrachloride to recover organic reactant and products. After distillation of the carbon tetrachloride extracts, the recovered $C_{10}Cl_4F_8$ and fluorination products were combined with the filtrate from the reaction mixture (total 1,250 grams) and fluorinated as before with an additional 500 grams of cobalt trifluoride. The last cobalt trifluoride did not change from the brown color, this being an indication that the reaction had gone to completion. The organic products were recovered from the reaction mixture in the manner described above, and there was obtained 1,200 grams of a colorless oil. This oil was neutralized by stirring with anhydrous sodium carbonate and filtering. The liquid recovered was analyzed and found to distill over a range of about 220 to 235 degrees centigrade and to have a chlorine content of 26.71 percent by weight, a molecular weight of 516 which corresponds to $C_{10}Cl_4F_{14}$ having a chlorine content of 26.9 percent by weight, and a molecular weight of 523 respectively.

EXAMPLE IV

A formulation for a base fluid for hydraulic and lubricant applications was prepared containing 50 percent by weight of the compound $C_{10}Cl_4F_{14}$ from Example III and 50 percent by weight of a dimethyl silicone oil (Dow-Corning Silicone "200" fluid with a viscosity of 50 centistokes at 25 degrees centigrade) and was tested in a Shell Four-Ball Tester to determine its wear characteristics. A description of the Shell Four-Ball Tester is disclosed in U.S. Patent 2,019,948. The results of the test are compared in the following table with test data obtained on stock Dow-Corning Silicone "200" fluid with a viscosity of 50 centistokes at 25 degrees centigrade and on a typical dibasic acid ester such as di-2-ethylhexyl sebacate which is a base stock for synthetic lubricants.

TABLE

| Test Fluid | Average Wear Scar Diameter, mm. at load of— | | |
|---|---|---|---|
| | 1 Kg. | 10 Kg. | 40 Kg. |
| Di-2-ethylhexyl Sebacate | 0.26 | 0.55 | 0.69 |
| Dow-Corning Silicone "200" | 0.37 | 0.44 | 1.43 |
| Dow-Corning Silicone "200" + 50 percent $C_{10}Cl_4F_{14}$ | 0.22 | 0.36 | 0.61 |

NOTE.—Wear tests were conducted in the Shell Four-Ball Wear Tester at 75 degrees centigrade, 620 r.p.m. and a one-hour test time using SKF Industries grade one steel ball bearings.

These results show that a fluid consisting of 50 percent of $C_{10}Cl_4F_{14}$ and 50 percent of a dimethyl silicone oil (Dow-Corning Silicone "200" fluid of 50 centistoke viscosity at 25 degrees centigrade) has the wear characteristics of lubricant base fluids derived from dibasic acid esters, e.g., di-2-ethylhexyl sebacate. From the test data it is apparent that the incorporation of the $C_{10}Cl_4F_{14}$ into the formulation has imparted anti-wear properties to the silicone oil that were not present without the $C_{10}Cl_4F_{14}$ fluid.

$C_{10}Cl_4F_{14}$ has other properties that make it useful as a fluid in applications requiring a non-reactive material of wide liquid range that has a viscosity of less than 5000 centistokes at a temperature of —60 degrees Fahrenheit. The viscosity of $C_{10}Cl_4F_{14}$ at a variety of temperatures is as follows:

TABLE

| Temperature, F.: | Viscosity centistokes |
|---|---|
| —60 | 3686.0 |
| 100 | 5.02 |
| 160 | 2.25 |
| 210 | 1.47 |

$C_{10}Cl_4F_{14}$ does not react with such reactive materials as chlorine, hydrogen fluoride, nitric acid, chlorosulfonic acid, fluorosulfonic acid, hydrogen chloride, oxygen and chlorine oxides. The fluid can be used in gages and metering equipment handling such chemicals. In addition it is particularly useful in the lubrication of valve stems and packings when they are in use at below zero degrees centigrade in chlorine and hydrogen chloride service.

The viscosity characteristics of $C_{10}Cl_4F_{14}$ are such that it is a useful flotation agent in gyros that are required to function under arctic conditions. $C_{10}Cl_4F_{14}$ is also useful as an additive in other fluids as it is soluble in SAE oil at room temperature to the extent of 25 percent by weight and is soluble in di-2-ethylhexyl sebacate at —10 degrees centigrade to the extent of 50 percent. This characteristic permits the raising of the flash point of flammable liquids.

It is to be understood that the invention is not limited to the specific examples which have been offered merely as illustrated and that modification may be made within the scope of the appended claims without departing from the spirit of the invention.

I claim:

1. The process for preparing a halocarbon having an empirical formula $C_{10}Cl_4F_8$ and a melting point of about 74 to 75 degrees centigrade, which comprises: reacting 1,2,3,3-tetrachlorotetrafluorocyclopentene with itself and with copper, while heating to the reflux temperature of the reaction mixture, and recovering the product so produced.

2. The compound having the structure:

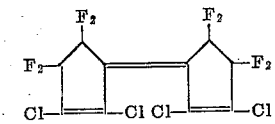

No references cited.